US006477757B2

(12) United States Patent
Viegener

(10) Patent No.: US 6,477,757 B2
(45) Date of Patent: Nov. 12, 2002

(54) PRESSING TOOL

(75) Inventor: Walter Viegener, Atendorn (DE)

(73) Assignee: Franz Viegener II GmbH & Co. KG, Attendorn (DE)

( * ) Notice: Subject to any disclaimer, the term of this patent is extended or adjusted under 35 U.S.C. 154(b) by 0 days.

(21) Appl. No.: 09/982,958

(22) Filed: Oct. 22, 2001

(65) Prior Publication Data

US 2002/0050041 A1 May 2, 2002

(30) Foreign Application Priority Data

Oct. 26, 2000 (DE) ........................................ 200 18 312

(51) Int. Cl.[7] ................................................ B23P 19/04
(52) U.S. Cl. ............................. 29/237; 29/270; 29/268
(58) Field of Search ..................... 29/237, 268, 243.56, 29/238, 270; 72/401, 402, 452, 416, 292

(56) References Cited

U.S. PATENT DOCUMENTS

| | | | | | |
|---|---|---|---|---|---|
| 3,921,477 | A | * | 11/1975 | Wilson | 81/128 |
| 4,673,174 | A | * | 6/1987 | Tabbert | 269/6 |
| 5,460,461 | A | * | 10/1995 | McGrath | 269/6 |
| 6,044,681 | A | * | 4/2000 | Frenken | 29/237 |
| 6,044,686 | A | * | 4/2000 | Dischler | 72/402 |
| 6,058,755 | A | * | 5/2000 | Viegener | 72/402 |
| 6,082,231 | A | * | 7/2000 | Tsai | 81/364 |

* cited by examiner

*Primary Examiner*—Lee Wilson
(74) *Attorney, Agent, or Firm*—Barnes & Thornburg

(57) ABSTRACT

A pressing tool for the unreleasable connection of two tubes comprises a pressing loop consisting of at least two segments and a tongs-type pressing clamp. The segments situated in the closing areas of the pressing loop and the free ends of the two halves of the pressing clamp are equipped with mutually corresponding coupling devices having a hinge-type construction. Thus, the pressing clamp can be swivelled with respect to the plane of the pressing loop.

7 Claims, 7 Drawing Sheets

PRESSING TOOL

BACKGROUND AND SUMMARY OF THE INVENTION

The present invention relates to a pressing tool for the unreleasable connection, for example, of a fitting and of a metal tube end introduced into a sleeve of the fitting, or other tube connecting constructions, comprising a pressing loop consisting of at least two segments and a tongs-type pressing clamp. The segments are situated in the closing areas of the pressing loop and the free ends of the two halves of the pressing clamp are equipped with mutually corresponding coupling devices.

Pressing tools of the above-mentioned type are known in many different embodiments and are used for pressing the sleeve of a fitting by cold forming the sleeve onto the end of the metal tube that an unreleasable firm connection is established.

Pressing tools are known, where the pressing loop has only two segments. Such pressing loops are used particularly in the case of smaller diameters. However, pressing loops are also known which consist of several chain links connected with one another in an articulated manner. Such pressing loops are particularly suitable for larger diameters.

Irrespective of whether the pressing loops consist of two or several segments, the coupling devices in the case of the known pressing tools have been constructed such that the pressing clamp can be applied to the pressing loop and can also be operated only in a common plane with the pressing loop.

The addressed plane of the pressing loop and thus also the so far only useful plane of the pressing clamp are situated perpendicular to the longitudinal axis of a fitting and thus also perpendicular to the longitudinal axis of a metal tube which is to be connected with the fitting. Since such connections must mainly be established at the construction site when laying pipes, because of the narrow space conditions in this case, the disadvantage often occurs that the pressing clamp can be coupled with the pressing loop and operated by the installer only under difficult conditions.

It is an object of the present invention to provide a pressing tool of the above-mentioned type in which the pressing clamp can be applied also under spatially narrow conditions in an operation-friendly manner to the pressing clamp and can be operated.

According to the invention, this object is achieved according to the invention in that the coupling devices have a hinge-type construction so that the pressing clamp can be swivelled with respect to the plane of the pressing loop.

As a result, it is achieved that if an application of the pressing clamp in a common plane with the pressing loop is not possible, almost any arbitrary other angle of the pressing clamp can be adjusted relative to the plane of the pressing loop. Thus, the pressing clamp can be applied not only for the most part without any problem to the pressing loop but can also be operated without any problems. This makes it easier for an installer to use such a pressing tool in almost any conceivable situation.

It is advantageous with respect to the manufacturing as well as with respect to the application for the coupling devices to consist of partially spherical cams, on the one hand, and of partially spherical caps, on the other hand.

This type of design of the coupling devices results in a good swivellability of the pressing clamp with respect to the pressing loop which is appropriate for the practical application. Furthermore, coupling devices of this type can be mounted in a simple and cost-effective manner on the pressing loop, on the one hand, and on the pressing clamp, on the other hand, because these parts are normally made by precision casting and corresponding coupling devices require only a corresponding shaping of the precision casting molds.

The cams may be mounted on the ends of the segments situated in the closing area, and the caps may be mounted on the free ends of the two halves of the pressing clamp.

Naturally, a reversal of the arrangement is also possible here without any disadvantage so that the cams are mounted on the two halves of the pressing clamp and the caps are mounted on the ends of the segments situated in the closing area.

Other objects, aspects and novel features of the present invention will become apparent from the following detailed description of the invention when considered in conjunction with the accompanying drawings.

DETAILED DESCRIPTION OF THE PREFERRED EMBODIMENTS

In one embodiment of the invention illustrated in FIGS. 1 to 5, the pressing tool consists of a pressing loop 3 produced of two segments 1 and 2 and of a pressing clamp 4, whose two halves 4*a* and 4*b* can be swivelled in a tongs-type manner about axes 5.

Figure 1:
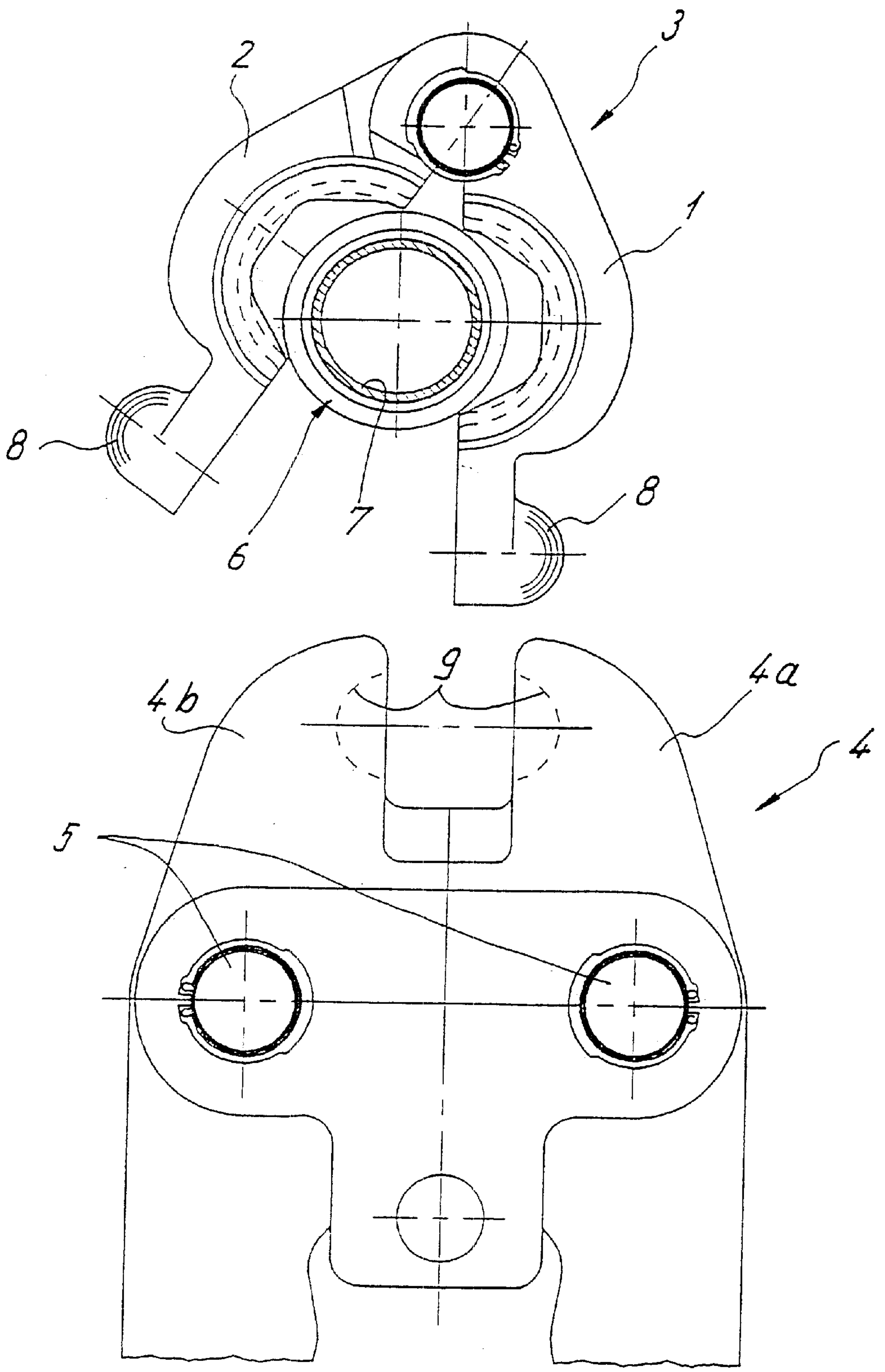
FIG. 1 is a top view of a pressing tool according to the invention with an opened pressing loop and a pressing clamp which has not yet been applied to the pressing loop.
Figure 2:
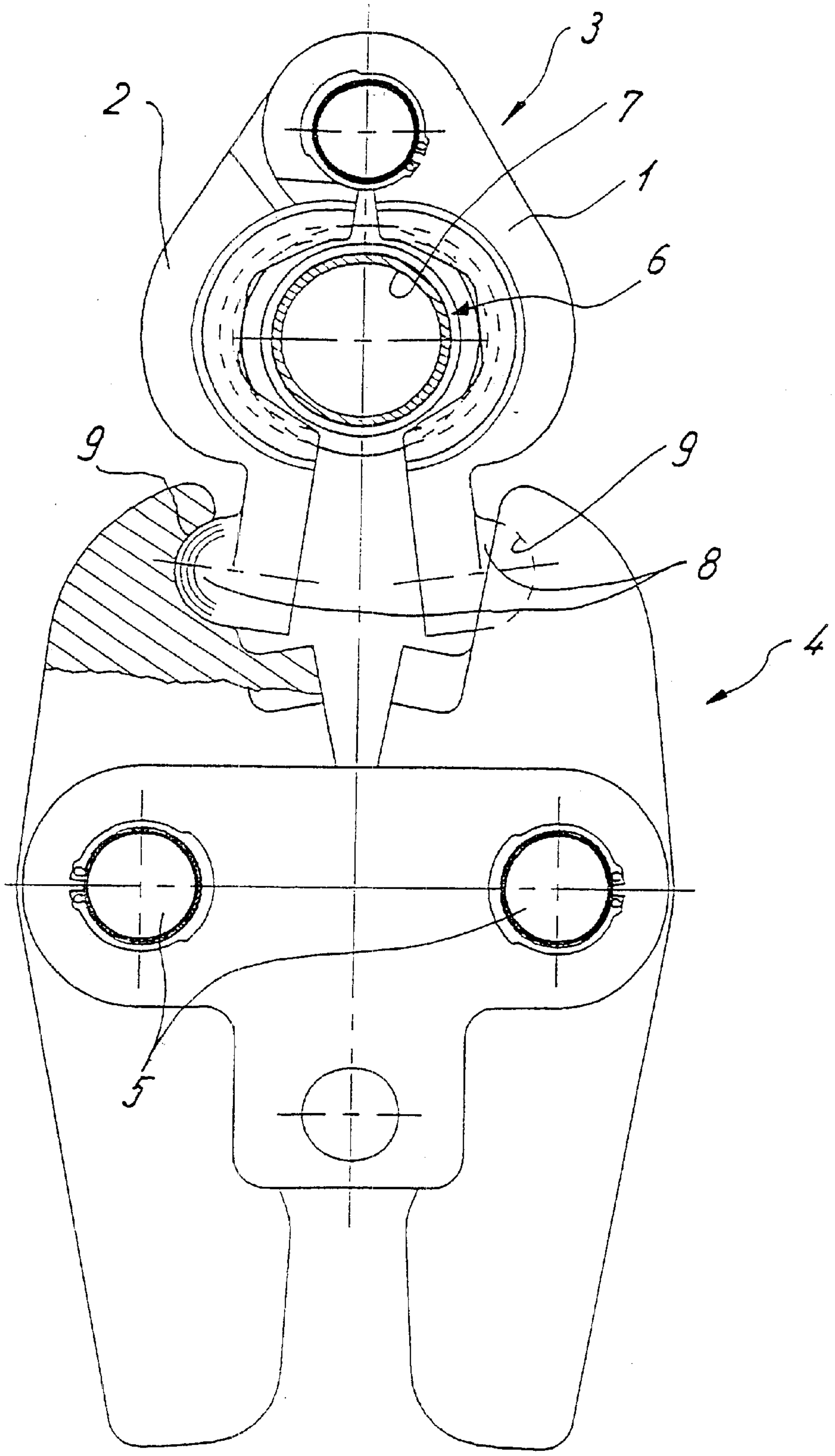
FIG. 2 is a view of the pressing tool which corresponds essentially to that of FIG. 1, with a mutually coupled pressing loop and pressing tool.

In a known manner and as illustrated in FIG. 1, the pressing loop 3 is placed in the opened condition around a fitting 6 which is to be undetachably connected with a metal tube end 7 introduced in the sleeve of this fitting. Subsequently, the two segments 1 and 2 are pressed together manually or by spring force so far that a coupling is possible between the pressing loop 3 and the pressing clamp 4, as illustrated in FIG. 2. Mutually corresponding coupling devices provided on the pressing loop 3 and the pressing clamp 4 interact in this position. According to the invention, these coupling devices are constructed in a hinge-type fashion so that the pressing clamp 4 can be swivelled with respect to the plane of the pressing loop 3.

In the illustrated embodiment, the coupling devices 8 and 9 are constructed in the shape of partially spherical cams on the ends of the segments 1 and 2 situated in the closing area of the pressing loop 3 as well as in the shape of corresponding partially spherical caps on the free ends of the two halves 4*a* and 4*b* of the pressing tool 4.

Figure 3:
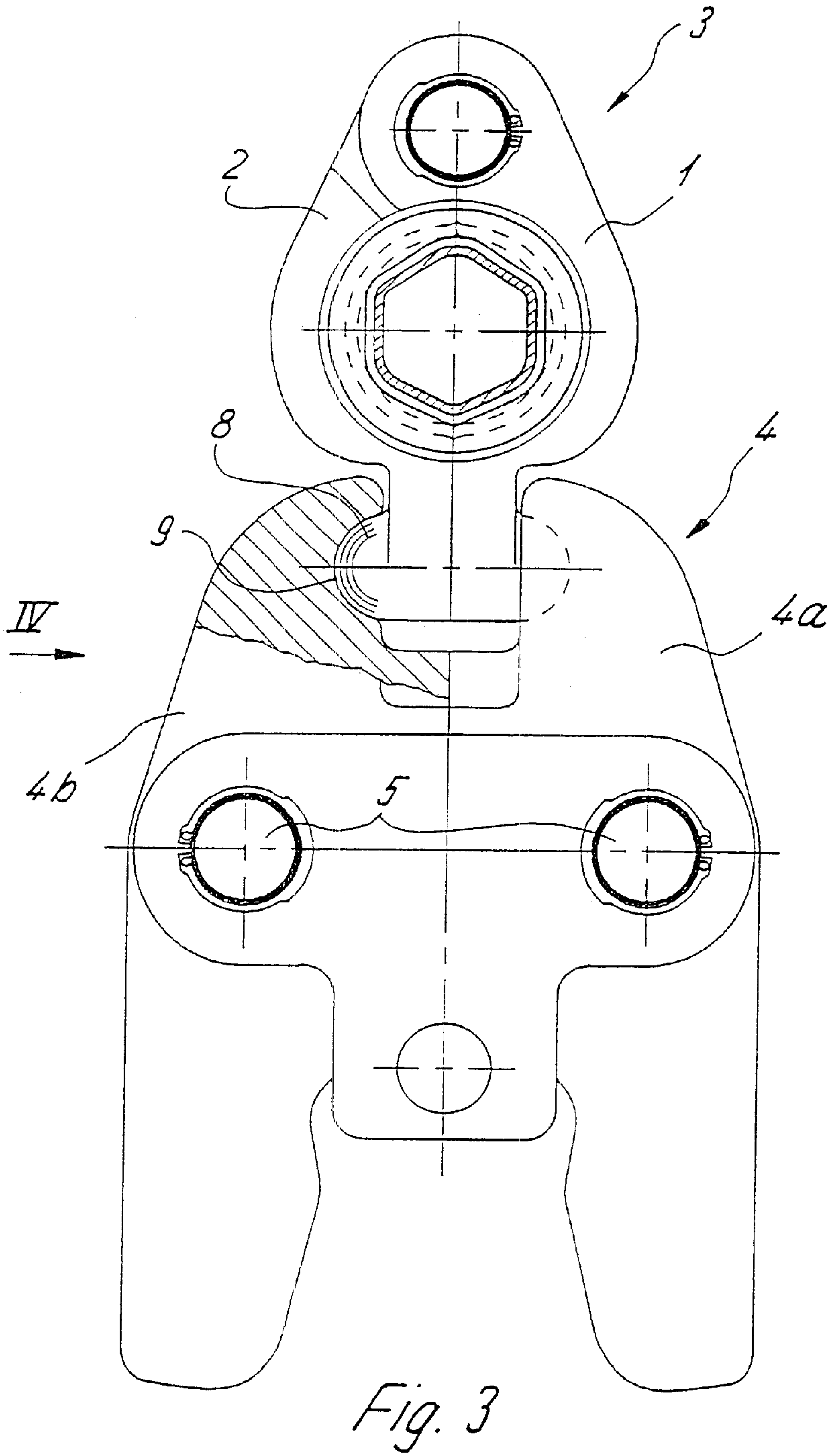
FIG. 3 is a view of the pressing tool which corresponds to that of FIG. 2, after the pressing-together of the pressing loop.
Figure 4:
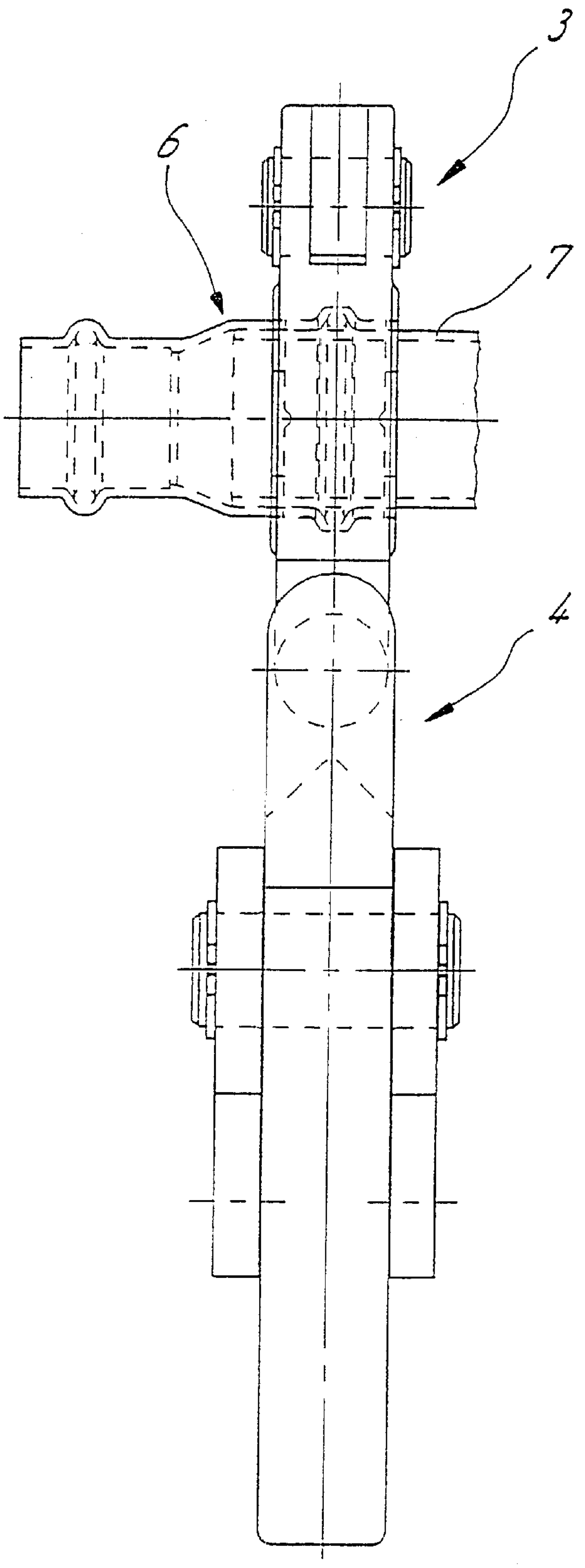
FIG. 4 is a view in the direction of the arrow IV in FIG. 3.

By the operation of the pressing clamp 4, the two ends of the segments 1 and 2 of the pressing loop 3 situated in the area of the closing position can be pressed together from the position according to FIG. 2 into the closing position according to FIG. 3. Correspondingly, the sleeve of the fitting 6 is pressed by cold-forming in a fixed and undetachable manner onto the metal tube end 7.

Figure 5:
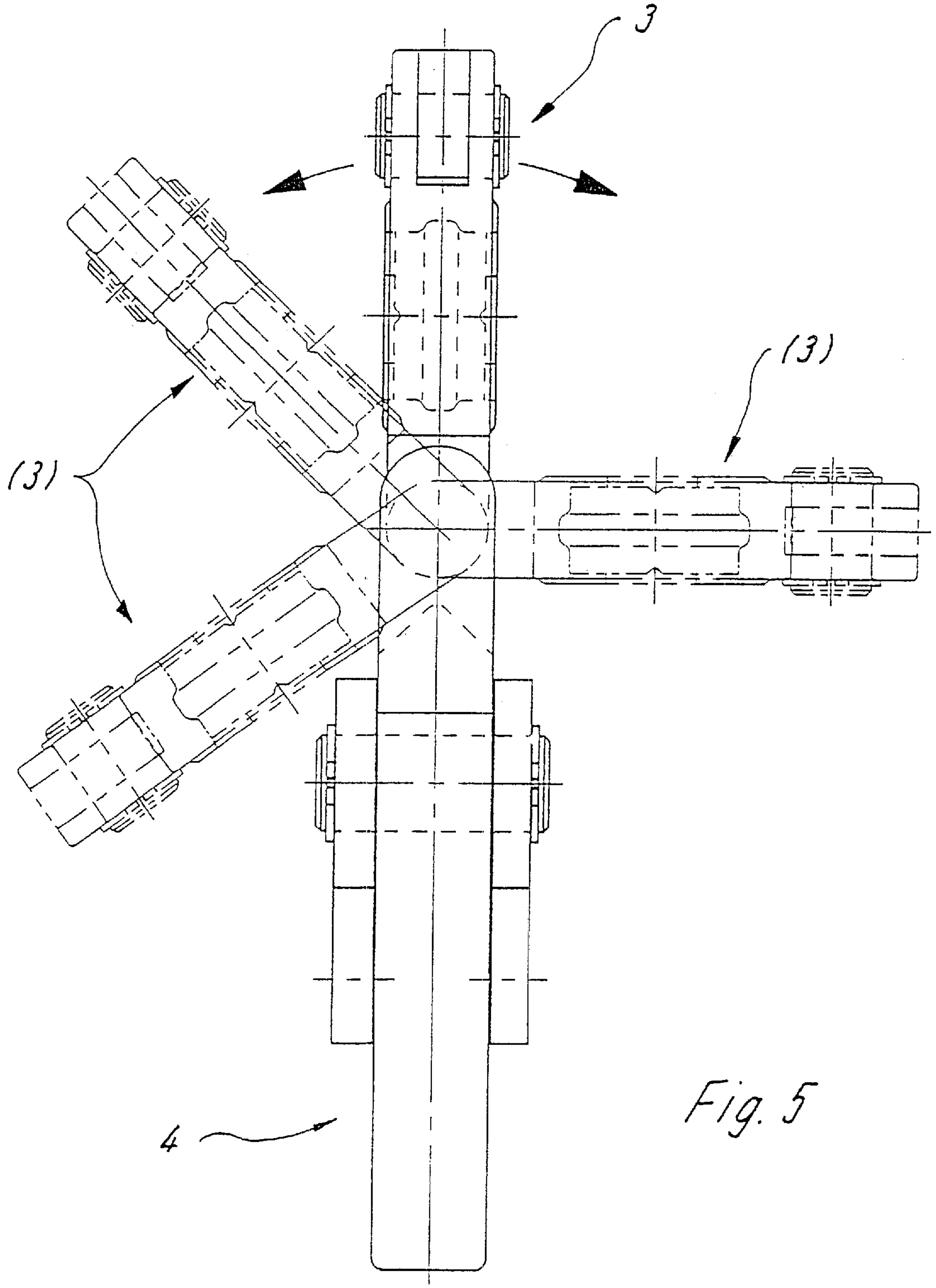
FIG. 5 is a view of a pressing tool which corresponds essentially to that of FIG. 4, with different angular positions between the pressing loop and the pressing clamp illustrated in phantom as examples.

It is particularly significant and particularly advantageous that it is possible as the result of the hinge-typed construction of the coupling devices 8 and 9 to swivel the pressing clamp 4 with respect to the plane of the pressing loop 3 (or vice-versa), as illustrated as an example in FIG. 5. When the mounting conditions have been concluded, it is therefore possible to couple and operate the pressing clamp 4 in the most favorable working position with the pressing loop 3.

Figure 6:
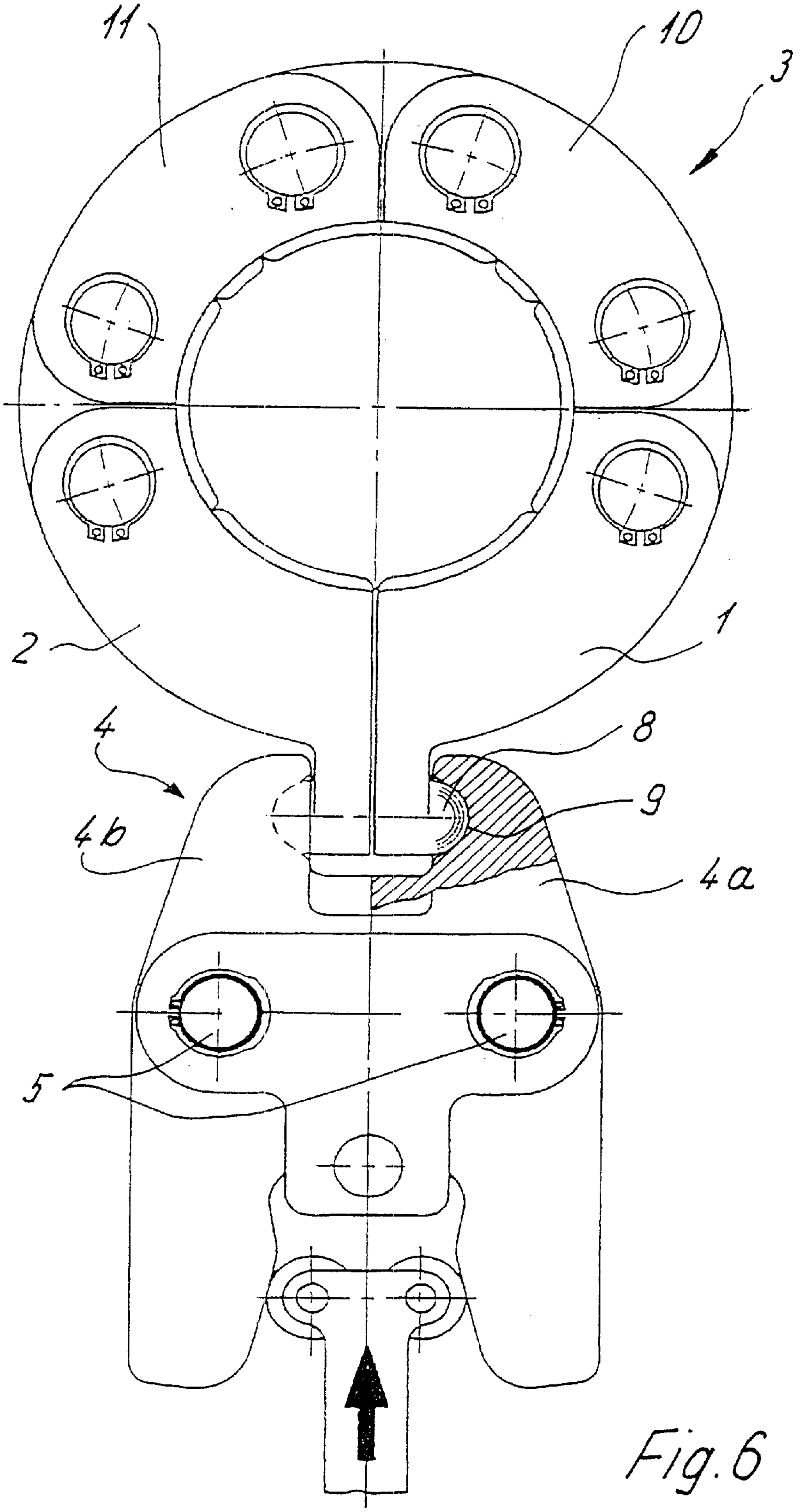
FIG. 6 is a view of a pressing tool according to another embodiment of the invention.

The embodiment according to FIG. 6 differs from the embodiment according to FIGS. 1 to 5 in that the pressing loop 3 consists of several segments 1, 2, 10 and 11. The segments having the reference numbers 1 and 2 are again situated in the closing area of the pressing loop 3 and can be coupled with the pressing clamp 4.

Here also, the coupling devices 8 and 9 have a hinge-type construction and consist, as described in the embodiment according to FIGS. 1 to 5, of partially spherical cams on the ends of the segments 1 and 2 situated in the closing area and of partially spherical caps 9 at the free ends of the two halves 4*a* and 4*b* of the pressing clamp 4.

Figure 7:
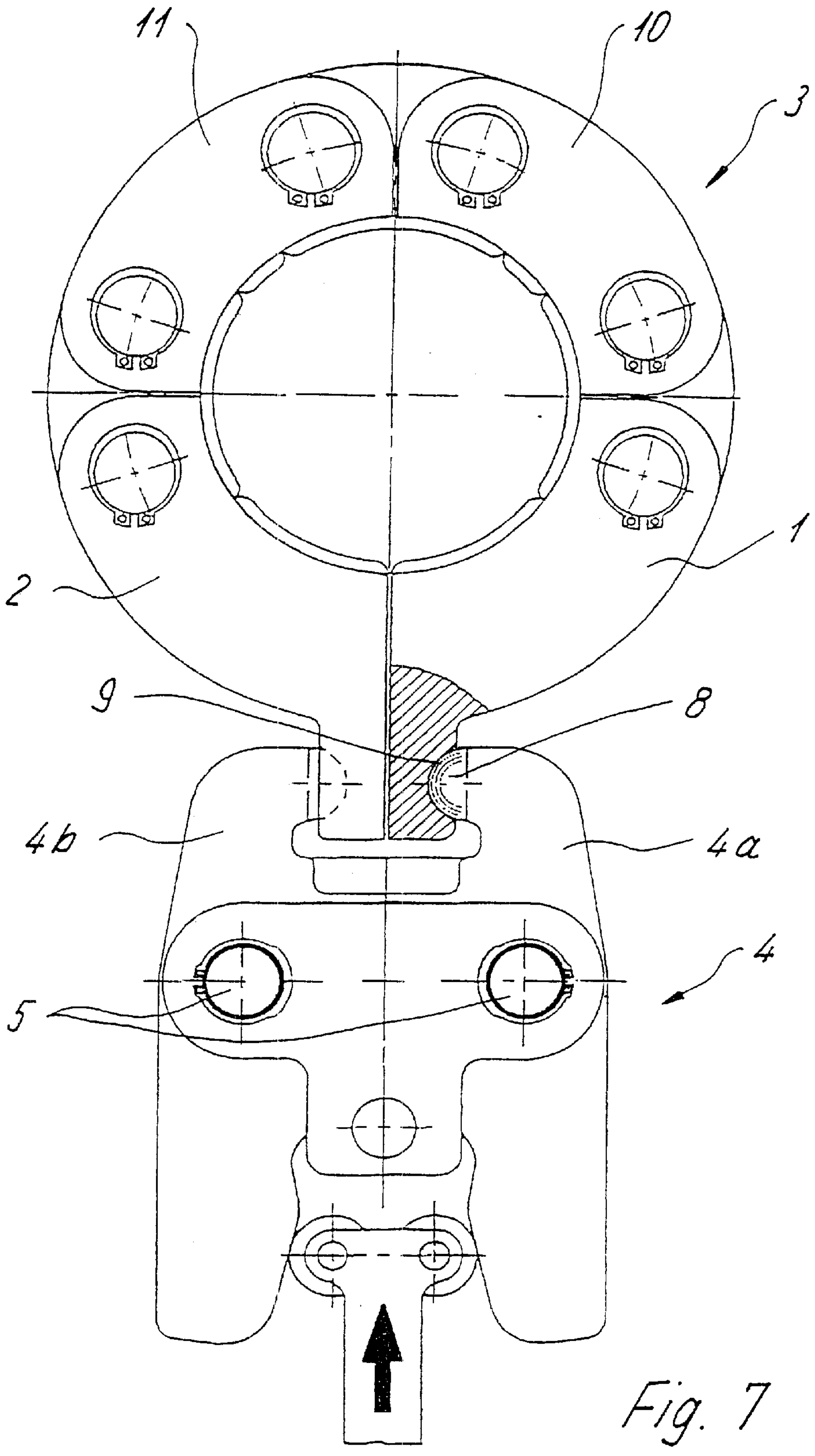
FIG. 7 is a view of another embodiment of the invention in a view corresponding to that of FIG. 6.

The embodiment according to FIG. 7 differs therefrom only in that the partially spherical cams of the coupling devices 8 and 9 are mounted on the free ends of the two halves 4*a* and 4*b* of the pressing clamp 4, while the partially spherical caps 9 are provided on the ends of the segments 1 and 2 of the pressing loop 3 situated in the closing area.

Also in these embodiments according to FIGS. 6 and 7, the pressing clamp 4 can be swivelled in a hinged manner with respect to the pressing loop 3, so that also here the entire pressing tool can be used appropriately with respect to the application under narrow space conditions.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A pressing tool for an unreleasable connection of a pair of tubes comprising:

a pressing loop consisting of at least two segments;

a tongs-type pressing clamp;

the segments situated in a closing area of the pressing loop and free ends of two halves of the pressing clamp including mutually corresponding coupling devices, having a hinge-type construction so that the pressing clamp can be swivelled angularly with respect to a plane of the pressing loop.

2. The pressing tool according to claim 1, wherein the coupling devices consist of partially spherical cams, and of partially spherical caps.

3. The pressing tool according to claim 2, wherein the cams are on the ends of the segments situated in the closing area and the caps are on the free ends of the two halves of the pressing clamp.

4. The pressing tool according to claim 2, wherein the cams are on the free ends of the two halves of the pressing clamp, and the caps are on the ends of the segments situated in the closing area.

5. The pressing tool according to claim 1, wherein the pressing loop has more than two segments.

6. The pressing tool according to claim 1, wherein the coupling devices are integrated portions of the segments and the pressing clamp.

7. The pressing tool according to claim 1, wherein the plane is transverse to a longitudinal axis of the pressing loop.

* * * * *